US011300502B1

(12) United States Patent
Duan et al.

(10) Patent No.: US 11,300,502 B1
(45) Date of Patent: Apr. 12, 2022

(54) TIME-WAVELENGTH OPTICAL SAMPLING SYSTEMS AND METHODS FOR DETERMINING COMPOSITION OF A SAMPLE BASED ON DETECTED PULSES OF DIFFERENT DURATIONS

(71) Applicants: Lingze Duan, Madison, AL (US); Lin Yang, Chapel Hill, NC (US)

(72) Inventors: Lingze Duan, Madison, AL (US); Lin Yang, Chapel Hill, NC (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 507 days.

(21) Appl. No.: 16/415,562

(22) Filed: May 17, 2019

Related U.S. Application Data

(60) Provisional application No. 62/672,963, filed on May 17, 2018.

(51) Int. Cl.
*G01N 21/00* (2006.01)
*G01N 21/25* (2006.01)
*G01N 21/27* (2006.01)

(52) U.S. Cl.
CPC .......... *G01N 21/255* (2013.01); *G01N 21/27* (2013.01); *G01N 2201/08* (2013.01)

(58) Field of Classification Search
CPC ........ G01N 21/00; G01N 21/01; G01N 21/62; G01N 21/17; G01N 27/00; G01N 1/00; G02F 1/3513; G02F 1/365; H04N 5/2353; H04N 5/374

USPC ...................................... 250/559.4, 239, 221
See application file for complete search history.

(56) References Cited

U.S. PATENT DOCUMENTS 10,270,998 B2 * 4/2019 Nakamura ........... H04N 5/2353

OTHER PUBLICATIONS

Muriel, et al, "Real-Time Fourier Transformer Based on Fiber Gratings," Optical Society of America, vol. 24, No. 1, pp. 1-3, Jan. 1999.

(Continued)

*Primary Examiner* — Que Tan Le
(74) *Attorney, Agent, or Firm* — Maynard Cooper & Gale, P. C.; Jon E. Holland

(57) ABSTRACT

A time-wavelength optical sampling system may be configured to determine a substance's composition based on variations in optical pulses caused by the substance's absorption of wavelengths of the pulse. A dispersion medium may disperse pulses to form stretched signal pulses that are incident on a substance under test. Optical gating is used to overlap each signal pulse with a portion of a reference pulse to generate a cross-correlation signal corresponding to a portion of the signal pulse, which may be detected by a slow detection speed detector. A controller controls delay introduced to the reference pulses so that different wavelength ranges are sampled for various signal pulses, thereby enabling the entire wavelength range for the signal pulses to be sampled over time without requiring an expensive high-speed optical detector. By analyzing absorption across the entire wavelength range as indicated by cross-correlation signals, the composition of the substance can be identified.

24 Claims, 7 Drawing Sheets

(56) References Cited

OTHER PUBLICATIONS

Chou, et al, "Time-Wavelength Spectroscopy for Chemical Sensing," IEEE Photonics Technology Letters, vol. 16, No. 4, pp. 1140-1142, Apr. 2004.
Solli, et al, "Amplified Wavelength-Time Transformation for Real-Time Spectroscopy," Nature Photonics, vol. 2, pp. 48-51, Jan. 2008.
Soundararajan, et al., "Time-Wavelength Optical Sampling Spectroscopy Based on Dynamic Laser Cavity Tuning," Optical Society of America, vol. 35, No. 5, pp. 1-7, 2018.

* cited by examiner

TIME-WAVELENGTH OPTICAL SAMPLING SYSTEMS AND METHODS FOR DETERMINING COMPOSITION OF A SAMPLE BASED ON DETECTED PULSES OF DIFFERENT DURATIONS

CROSS REFERENCE TO RELATED APPLICATION

This application claims priority to U.S. Provisional Application No. 62/672,963, entitled "Time-Wavelength Optical Sampling Systems and Methods" and filed on May 17, 2018, which is incorporated herein by reference.

STATEMENT REGARDING FEDERALLY SPONSORED RESEARCH OR DEVELOPMENT

This invention was made with Government support under contracts ECCS1254902 and ECCS1606836 awarded by the National Science Foundation. The Government has certain rights in the invention.

RELATED ART

Traditional spectrometry may be performed by converting optical signals into a spatially-dependent power, such as using a prism effect in order to separate different wavelengths of light into different displacements. Film or another type of detector may be used to take a picture of the spectrum or measure the spectrum over space. Such techniques are limited in use because spatially-dependent spectrometry requires a certain amount of space to maintain high resolution. Reducing space used for detection therefore also reduces resolution.

Other methods may map an optical spectrum using time instead of space. It has been observed that different wavelengths of light travel in optical fibers at different speeds due to dispersion. For example, components of light (e.g., different wavelengths) travel at different speeds through optical fiber. As a result, different wavelengths are separated in time on the output end of the fiber, and the time sequence of wavelengths indicates spectrum. In this regard, optical time-wavelength spectrometry is not affected by size of detector and does not require large amounts of space to maintain resolution.

However, optical time-wavelength spectrometry may be problematic to use. In order to sense wavelengths of the optical signal, a fast detector is required because even with reasonable fiber length, temporal separation for reasonable spectral width is sub-nanoseconds (picoseconds). Some detectors may be capable of achieving speed needed to measure such temporal separation effectively, but such detectors are typically very expensive.

In addition, such temporal separation of an optical signal leads to reduction of signal-to-noise ratio. There may generally be some level of noise present within a measurement system. Conventional time spectrometers may stretch the power over a long period of time. Power thus is lower per unit of time, thereby resulting in a lower signal-to-noise ratio. Such signal degradation can make accurate detection of the optical signal challenging. Improved techniques for optical spectrometry are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
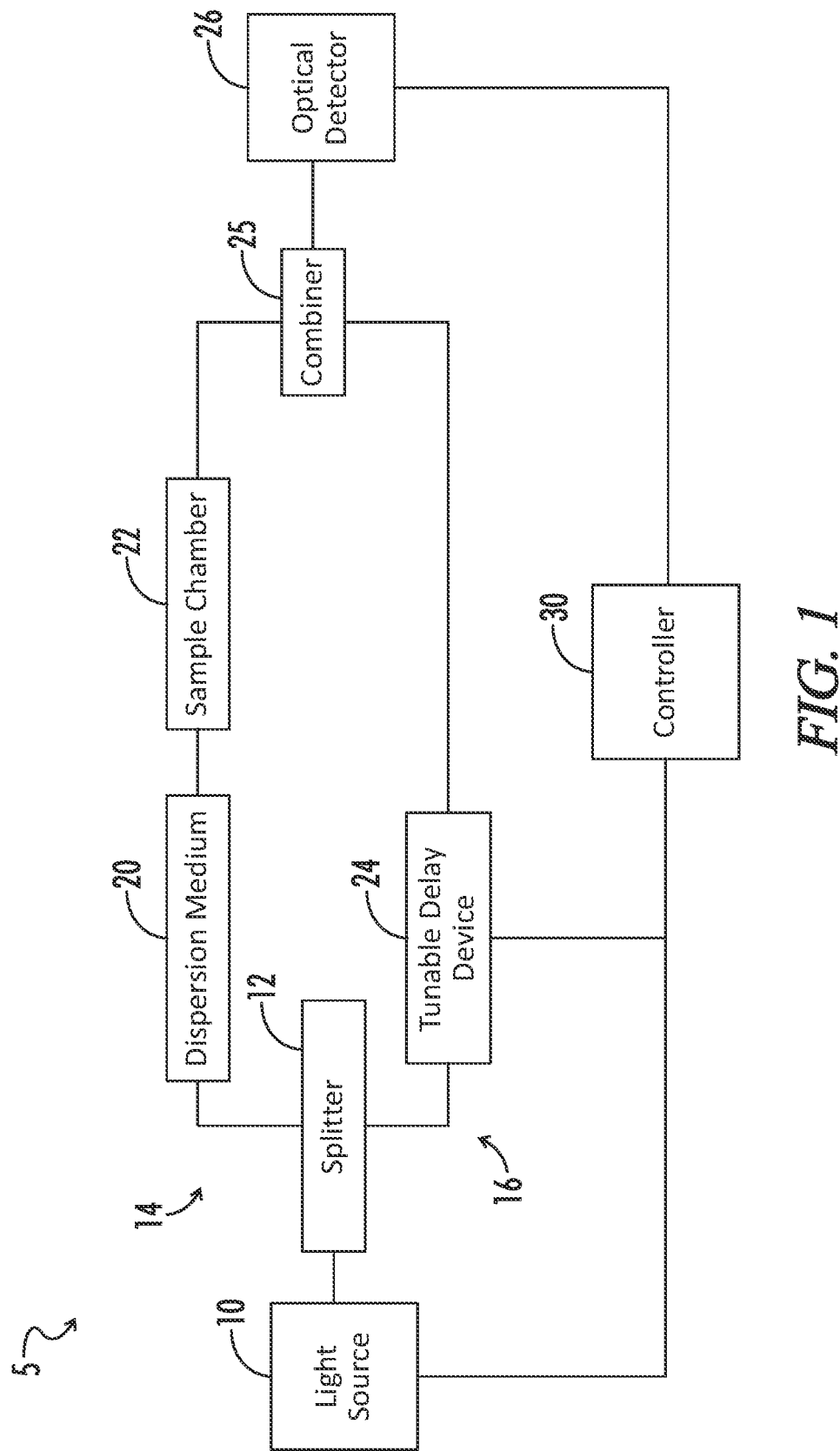
FIG. 1 depicts a time-wavelength optical sampling system in accordance with some embodiments of the present disclosure.

The present disclosure generally pertains to various embodiments of a time-wavelength optical sampling system configured to determine a substance's composition by identifying wavelengths of an optical pulse absorbed when the pulse interacts with the substance. In some embodiments, a time-wavelength optical sampling system detects variations in energy of an optical pulse that may be indicative of wavelengths absorbed by a substance for which composition should be determined. A substance's composition may be identified based on information about wavelengths of optical power it absorbs. The system may compare the detected variations with data about known variations indicative of wavelengths of optical pulse power absorbed by various substances. Based on the comparison, the system may identify a composition of the substance.

As an example, the system may be configured to determine composition of a trace gas based on variations in an optical pulse caused when the trace gas absorbs power at one or more wavelengths of the pulse. The system may be configured to temporally separate the pulse's power so that absorption of the pulse's power at particular wavelengths can be easily identified. Thus, the system may "stretch" a pulse over time using a dispersion medium before the pulse is provided to the trace gas. After the pulse passes through the trace gas, variations in the pulse's power may be present at wavelengths where absorption has occurred.

The system may use optical gating to sample a cross-correlation signal to detect power variations in a stretched signal pulse due to wavelength absorption. An unstretched "reference" or "sampling" pulse (e.g., a pulse that is shorter in duration and having a higher peak power) may be used as a gating signal to selectively sample or "probe" the power of a portion of a stretched pulse. When both a reference pulse and a time-stretched "signal" pulse impinge on a photodetector, optical interference between the two pulses generates a cross-correlation signal. Such a cross-correlation signal only appears in the detector output when both pulses are present at the same time. Therefore, by selectively measuring the cross-correlation signal, one can exclusively probe the portion of the stretched pulse that overlaps with the "reference" pulse. The cross-correlation signal strength can be qualitatively written as $I_{cc}(t)=A[I_{rp} \cdot I_s(t)]^{1/2}$, where A is a constant. $I_{rp}$ is the peak power of the "reference" pulse. $I_s(t)$ is the power of the portion of the stretched "signal" pulse that overlaps with the "reference" pulse. It can be a function of relative delay time t between the "reference" and the "signal" pulses. This relation results in two important consequences: (1) power variation in the stretched "signal" pulse is imprinted on (e.g., remains detectable in) the cross-correlation signal $I_{cc}(t)$; and (2) by increasing the peak power of the "reference" pulse, the cross-correlation signal $I_{cc}(t)$ may be increased to a power level that is much greater than the original power level of the "signal" pulse $I_s(t)$, thereby increasing the signal-to-noise ratio. In this regard, the detector can detect or "sample" variations in the overlapped portion. The system can sample variations of additional portions of subsequent stretched pulses by controlling the relative delay time t at which subsequent reference pulses arrive for overlapping with a stretched pulse. This can be done with a tunable optical delay line or other approaches with similar functionality. The system can sample additional portions of successive stretched pulses until a sufficient number of samples has been collected to enable the system to identify a composition of the trace gas.

FIG. 1 depicts a time-wavelength optical sampling system 5 in accordance with some embodiments of the present disclosure. The optical sampling system 5 may include various components and be configured for determining absorptive properties of a trace gas specimen by observing time-wavelength optical power variations. In some embodiments, the system 5 may include a light source 10 configured to generate a plurality of optical pulses. The plurality of optical pulses may be provided to an optical splitter 12 configured to divide the pulses into two or more portions and provide them to two or more optical fiber paths 14, 16, as described further below. The system 5 further comprises a dispersion medium 20, a sample chamber 22 containing a trace gas, a tunable delay line 24 for controlling timing at which reference pulses arrive at combiner 25, an optical detector 26 for detecting the cross-correlation signal, and a controller 30 coupled to control operation of components of the system 5. The system 5 may include other components and have other configurations in other embodiments.

The light source 10 may comprise a single pulse laser, although in some embodiments the light source 10 may comprise two or more pulse lasers. In the latter case, the pulses from a first laser are time-stretched and serve as the "signal" pulses whereas the pulses from a second laser serve as the "reference" pulses. In some embodiments, there may be a small offset between pulsing rates of signals produced by the first and second lasers of the two or more lasers of light source 10, which may create the same effect as the tunable delay line 24, described in further detail below. In such cases, the system 5 may not require a tunable delay line 24 as its functionality can be essentially replicated by controlling pulsing rates of each of the two or more lasers of light source 10. The light source 10 may be configured to allow external control of the characteristics of the optical signal, such as power and repetition frequency (e.g., pulsing rate) of the optical pulses. In some embodiments, the light source 10 may generate an optical signal having pulses with a duration in approximately the femtosecond (fs) timescale and a repetition frequency of approximately 100 MHz, although other pulse durations and repetition frequencies of the signal are possible. In addition, for the purpose of performance optimization, the light source 10 may be configured to reshape the temporal profile of the pulses (e.g., via pulse shapers) or to broaden the spectrum of the pulses (e.g., via non-linear fiber).

Figure 2:
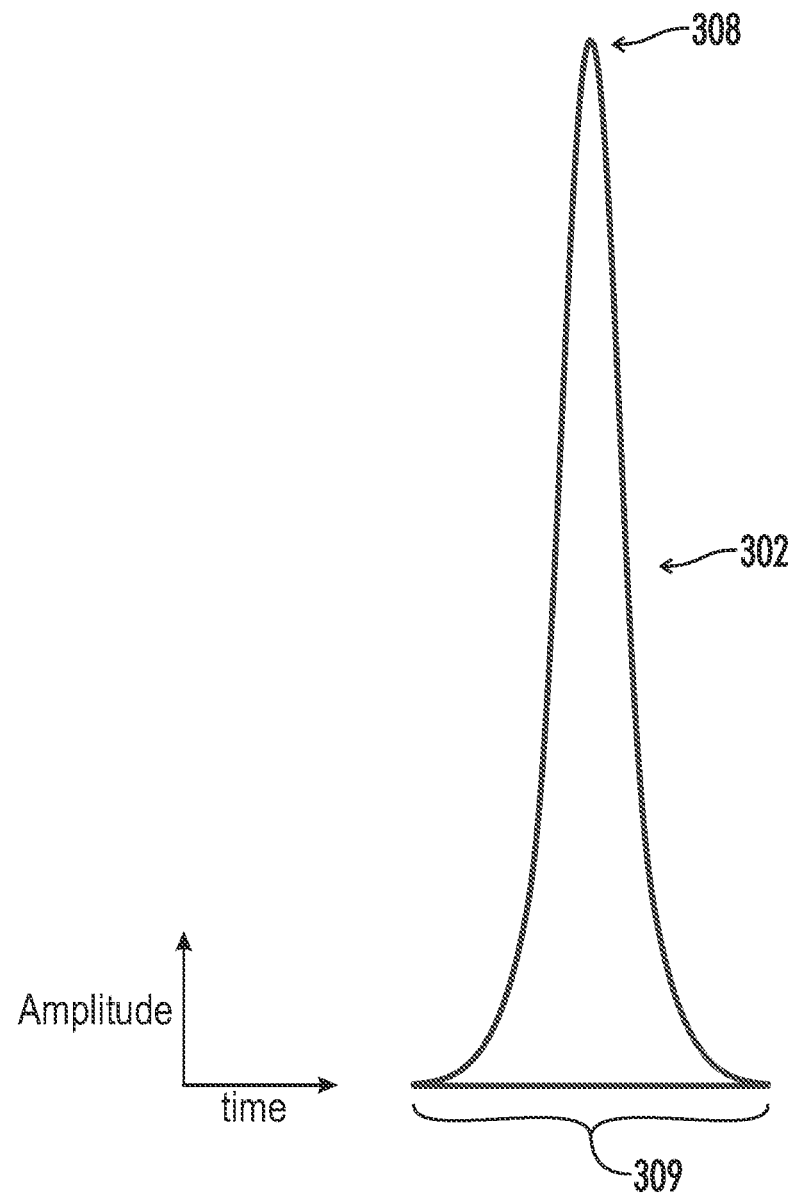
FIG. 2 depicts a time-dependent graph of a reference pulse of a time-wavelength optical sampling system in accordance with some embodiments of the present disclosure.

FIG. 2 depicts a reference pulse 302 of the optical signal generated by the light source 10. The pulse 302 may have a pulse duration 309 of approximately 250 fs, but other values are possible (e.g., typically between approximately 100 and 500 fs or otherwise). The reference pulse 302 is essentially a Gaussian-shaped wideband pulse, although other shapes and characteristics (e.g., power values, frequencies, etc.) are possible for reference pulse 302 in other embodiments.

Returning to FIG. 1, the splitter 12 may be configured to receive the optical signal from the light source 10 and divide it into two or more portions. Each of the two or more portions of the optical signal leaving the splitter 12 may include reference pulses having essentially the same characteristics (e.g., the pulse 302 may be divided equally), but in some embodiments, splitter 12 may be configured to divide the pulses 302 unequally.

Figure 4:
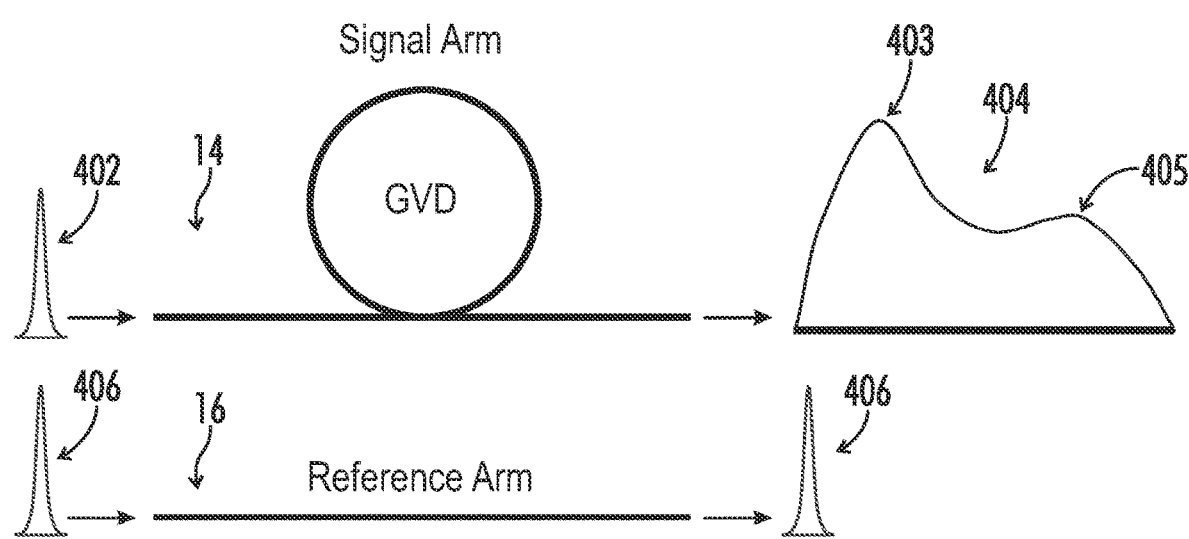
FIG. 4 depicts signal paths for transmitting pulses in a time-wavelength optical sampling system in accordance with some embodiments of the present disclosure.

The splitter 12 may provide a first portion of the optical signal for transmission across the first path 14 and second portion of the optical signal for transmission across the second path 16. FIG. 4 depicts exemplary signal paths 14, 16 in accordance with some embodiments of the present disclosure. A pulse 402 may be time-stretched to yield stretched signal pulse 404 as it travels through first path 14 ("Signal Arm" in FIG. 4). The signal pulse 404 of FIG. 4 includes power variations in its amplitude (e.g., first amplitude 403, and second amplitude 405) caused by wavelength absorption from the trace gas. The reference pulse 406 may be essentially the same after it has traveled through the second path 16 (e.g., "Reference Arm" of FIG. 4). Note that the first and second paths 14, 16 are depicted as including one or more fiber segments, but one or more segments of first path 14 and second path 16 may be other transmission media suitable for optical signal transmission (e.g., free space, etc.).

With reference again to FIG. 1, the first path 14 contains the dispersion medium 20 and the sample chamber 22. In some embodiments, an additional optical delay line is included in the first path 14. Such a delay line typically includes one or more lengths of optical fiber (e.g., single mode fiber, dispersion compensating fiber, etc.). The first path 14 may include various components configured to couple the dispersion medium 20, the sample chamber 22, and the combiner 25. At the end of first path 14, the combiner 25 is used to receive pulses of the first portion of the optical signal.

The dispersion medium 20 of the first path 14 may be configured to "stretch" power of pulses of the first portion of the optical signal from the light source 10 so that each pulse is elongated or drawn out over a longer time (e.g., has a longer period, but lower average power) thereby separating wavelengths of optical power along portions of the elongated pulse, such that absorption by the sample occurs over different times. In the context of this document, such pulses may be referred to as "stretched" or "signal" pulses. In some embodiments, the dispersion medium 20 may comprise an optical fiber having a length that is selected to achieve desired separation (stretching or elongation) of pulses of the first portion of the optical signal. For example, the dispersion medium 20 may include a long optical fiber, such as an approximately 1 kilometer (km) length of single mode fiber, but the dispersion medium 20 may include other types of fiber or devices in other embodiments. In some embodiments, the fiber of the dispersion medium 20 may have a shorter length but may be engraved using engravings (e.g., fiber Bragg gratings) for producing essentially equivalent dispersion or stretching of pulses as may be achieved using fiber of longer length.

As an illustration of the operation of the dispersion medium 20, optical power (e.g., optical energy) associated with the wavelengths also may be distributed over time as a pulse travels through dispersion medium 20. Average power of the pulse also may be reduced. Wavelengths of optical power of the pulse may travel through the dispersion medium 20 at different speeds due to optical dispersion caused by the medium 20. Exemplary dispersion values include approximately 17 ps/(nm·km) for single mode fiber, but other dispersion values are possible in other embodiments. In this regard, wavelengths of a pulse may arrive at the end of the dispersion medium 20 at different times, resulting in "stretching" of the pulse's power and time separation of the pulse's various wavelengths. That is, a pulse of the first portion of the optical signal may have a shorter period and higher average power value when it enters the dispersion medium 20 than when it leaves.

Figure 3:
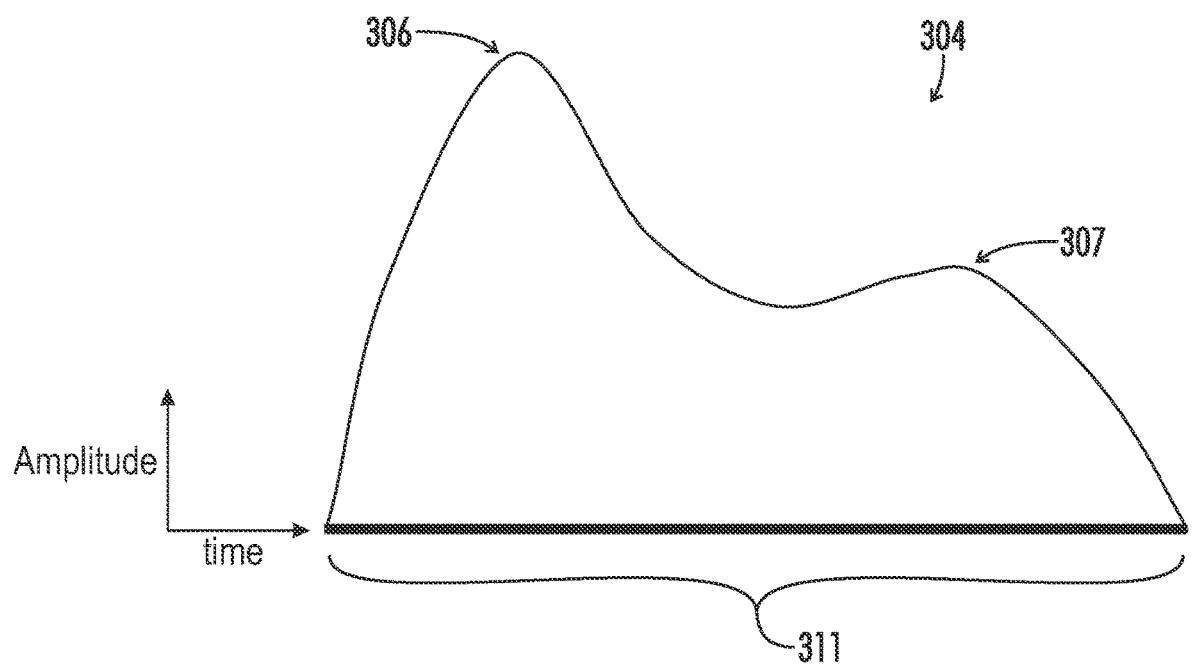
FIG. 3 depicts a time-dependent graph of a signal pulse of a time-wavelength optical sampling system in accordance with some embodiments of the present disclosure.

To further illustrate stretching of pulses by dispersion medium 20, reference is made to FIGS. 2 and 3 which respectively depict exemplary aspects of a pulse before and after the pulse travels through the dispersion medium 20. The waveforms of pulses shown in FIGS. 2 and 3 may be compared for exemplary and illustrative purposes.

As depicted in FIG. 3, a pulse may be time-stretched when it travels through the dispersion medium 20, resulting in exemplary stretched signal pulse 304. Dispersion (e.g., stretching) achieved by the dispersion medium 20 may be sufficient to yield temporal separation for spectral width of wavelengths of the signal pulse 304. By cross-correlating successive signal pulses with reference pulses synchronized to cross-correlate with one or more desired portions of the signal pulse 304, sufficient variations in power of the signal pulse 304 may be detected to enable identification of the sample substance. In addition, this ability to control times at which cross-correlation occurs may allow detection of the cross-correlation signal (and hence, power variations of the signal) by a detector having a longer response time (e.g., slower detection speed).

As noted above, reference pulse 302 of FIG. 2 has a first duration 309. However, as shown by FIG. 3, stretching by the dispersion medium may lengthen the pulse's duration 311. Pulse 304 may have pulse duration 311, which may be longer than pulse duration 309 of the reference pulse of FIG. 2. In this regard, the dispersion medium 20 may increase the pulse's duration, such as from approximately 250 fs pulses (e.g., duration 309 of reference pulse 302) to approximately 30 picoseconds (ps) (e.g., duration 311 of signal pulse 304). Values associated with signal pulse 304 are exemplary, and in other embodiments, other values of peak amplitude, duration and other characteristics of signal pulse 304 are possible.

A signal pulse 304 may be provided to the sample chamber 22 after it leaves the dispersion medium 20. When a pulse 304 passes through the sample chamber 22, the sample (e.g., trace gas) may absorb optical power of the pulse 304 at various wavelengths, yielding power variations that are reflected in the signal pulse's amplitude. For example, the pulse's amplitude may vary over time so that it has two or more different amplitudes, such as a first amplitude 306 and second amplitude 307, but other numbers of amplitudes may be possible depending on the variations. These amplitude variations may be indicative of wavelength absorption as described further below.

The variations may be variations in power that are indicative of wavelengths of power absorbed by the substance within sample chamber 22. When the pulse exits the sample chamber 22, it may include such variations indicative of wavelengths absorbed by the trace gas.

Note that, in some embodiments, an exemplary trace gas within the sample chamber 22 may be hydrogen cyanide (HCN), although other substances are possible. The sample chamber 22 may have various dimensions, and characteristics appropriate for containing a sample of the substance for which time-wavelength optical sampling is desired. In the embodiment of FIG. 1, the sample chamber 22 may be a gas cell configured to contain the trace gas at a pressure of approximately 300 Torr or other pressure, and may be approximately 50 millimeter (mm) in length, but other types of sample chambers 22 are possible. In this regard, it should be understood that, although the system 5 of FIG. 1 is configured to include a sample chamber 22 containing a trace gas, in other embodiments, a sample may be other types of substances in various states, and system 5 may be configured to determine composition of the sample using the techniques described herein.

After a signal pulse 304 exits the sample chamber 22, it may proceed to the combiner 25 (e.g., via transmission path 14), where the pulse may overlap with a reference pulse 302 from the second portion of the optical signal provided via second transmission path 16 to generate interference, which may be detected as a cross correlation signal, as described further below. In some embodiments, the combiner 25 may be a fiber coupler configured to combine or overlap the optical signals. The combiner 25 may combine the signals for transmission via a single transmission line. The combiner 25 can be other devices and have other configurations in other embodiments.

With reference now to the second path 16, in some embodiments, the path 16 may include one or more lengths of optical fiber (e.g., single mode fiber, dispersion compensating fiber, etc.), and may couple the splitter 12, tunable delay line 24, and combiner 25 to receive reference pulses 302 of the second portion of the optical signal. Reference pulses 302 may be provided from splitter 12 to tunable delay line 24, which may be configured to control a delay of the pulses 302 as described further below with regard to FIG. 5. The tunable delay line 24 may then provide the reference pulses 302 to combiner 25.

Note that in optical time-wavelength spectrometry, temporal separation for spectral width of optical pulses may be approximately sub-nanoseconds (e.g., picoseconds). This may be true even for systems utilizing various lengths of dispersion-inducing fiber as a dispersion medium. Power thus is lower per unit of time, thereby reducing signal-to-noise ratio and decreasing detection accuracy for pulse variations. Thus, an expensive, high-speed detector may be necessary to detect power variations where temporal separation of wavelength spectral widths is in the sub-nanoseconds timeframe. However, detection even by a high-speed detector may require stretching of pulses to hundreds of picoseconds or nanoseconds, resulting in reduction of signal-to-noise ratio on the detector and adding to input power required (e.g., a higher-powered signal from light source 10). In this regard, the system 5 may be configured to use optical gating to overcome the need for expensive photodetectors, as well as to achieve better signal-to-noise ratios at the detector 26.

To address this issue, optical gating may be employed (e.g., by logic of controller 30) whereby an optical gate is "opened" when signal pulses (e.g., signal pulse 304) overlap with reference pulses (e.g., reference pulse 302) in the combiner 25 to create interference, thereby generating a cross-correlation signal. The optical gate may be "closed" when no cross-correlation is occurring. In this regard, although the detector 26 may be configured to detect each of the signal pulse 304 and reference pulse 302 essentially continuously, the detector 26 measures characteristics of the cross-correlation signal to detect power variations, as descried further below with regard to FIG. 6. Note that, in some embodiments, the cross-correlation signal may vary (e.g., as in alternating current) and can be separated from the other power signals of the signal pulse 304 and reference pulse 302 and measured by the optical detector 26. Optical gating may be performed using other components and techniques in other embodiments.

In the embodiment depicted by FIG. 1, when a pulse 302 is split by the splitter 12, the tunable delay line 24 is controlled by the controller 30 in order to add a sufficient delay to pulse 302 in the path 12 so that this pulse 302 arrives at the combiner 24 while the stretched version of the pulse is being received by the combiner. Thus, the pulse 302 in the path 16 overlaps and cross-correlates with a portion of the signal pulse 304 from the path 14. This generates a cross-correlation signal for detection by the detector 26, which may have a higher power value than the signal and reference pulses, thus improving detection. This operation may be performed for one or more successive pulses 302, which may have essentially the same characteristics, such as amplitude and frequency, and the delay introduced by the tunable delay line 24 may be varied for each pulse such that the entire wavelength range of the signal pulses is detected by the detector 26 over many successive pulses. As an example and as described below with regard to FIG. 6, a first wavelength range may be detected for a first pulse, a second wavelength range may be detected for another pulse, and so on until the entire wavelength range is detected. By analyzing the entire wavelength range, the type of sample in the chamber 22 can be identified.

Thus, the system 5 may be configured to use the tunable delay line 24 to synchronize reference pulses in the path 16 with the signal pulses in path 14 as desired, so that each time the gate is "open," a reference pulse is cross-correlated with a different portion (e.g., different range of wavelengths) of a signal pulse. In this way, the system may sample power variations across essentially the entire wavelength range of a signal pulse using optical gating. Further, since the entire wavelength range is captured from multiple (e.g., many) pulses over time, the detector 26 is not required to have a high sampling speed so that less expensive detectors 26 may be used. That is, less data must be captured for each pulse relative to an embodiment in which a detector 26 is used to capture the entire wavelength range of a single pulse.

Figure 5:
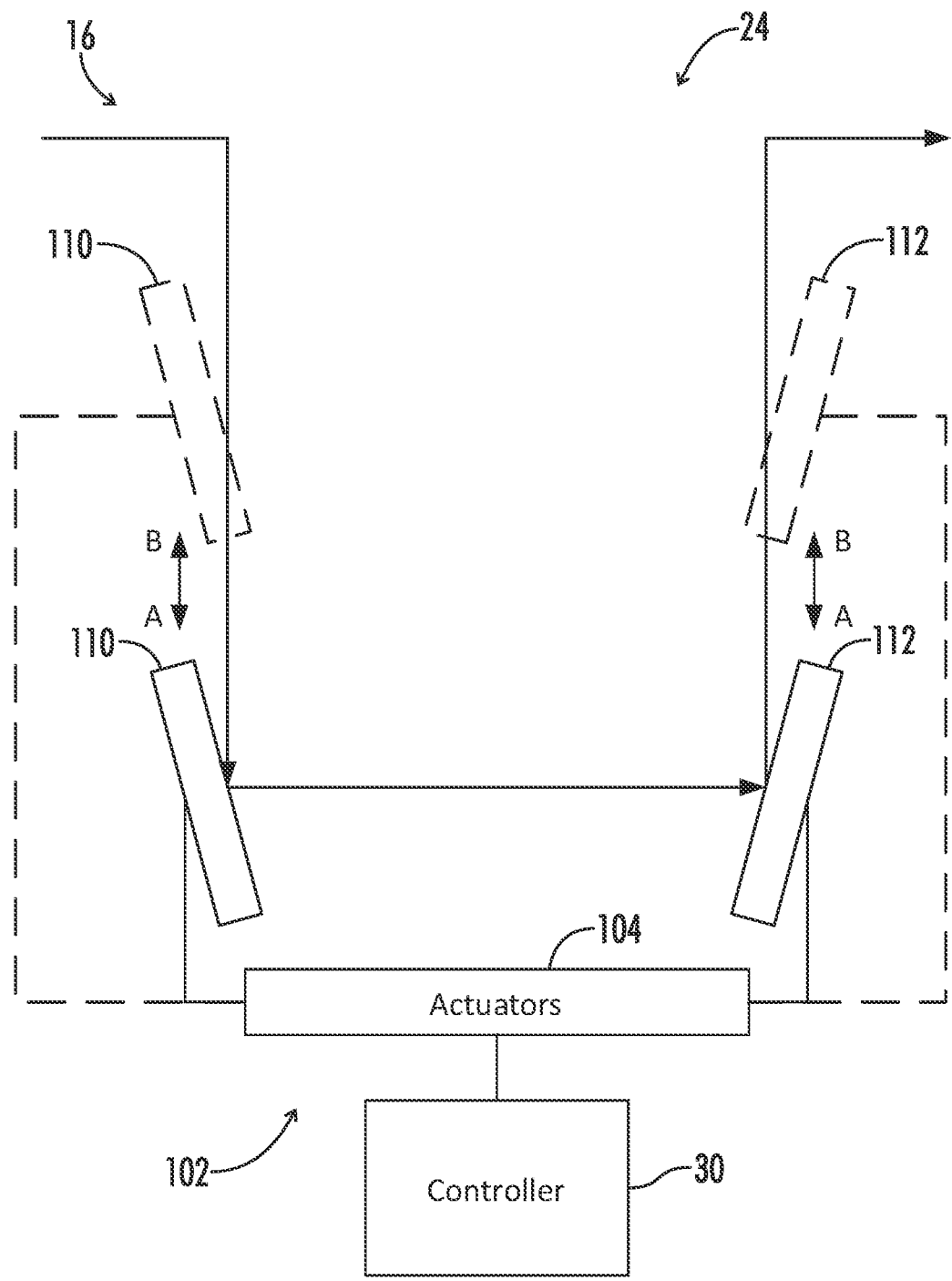
FIG. 5 depicts a tunable delay line of a time-wavelength optical sampling system in accordance with some embodiments of the present disclosure.

FIG. 5 depicts a tunable delay line 24 in accordance with some embodiments of the present disclosure. The tunable delay line 24 may be coupled to receive a reference pulse 302 from the light source 10 via splitter 12, and to delay the pulse 302 using a motorized translation stage 102.

The motorized translation stage 102 may include one or more actuators 104 configured to adjust positions (e.g., move the mirrors up and down, such as between positions A and B) of two or more mirrors (e.g., mirrors 110, 112) or other components to control timing at which the pulses are received at combiner 25. The motorized translation stage 102 of FIG. 5 may include a first mirror 110 and second mirror 112 configured to facilitate propagation of the optical signal through tunable delay line 24. Other numbers of mirrors are possible in other embodiments. In some embodiments, other types of components configured to achieve desired delay of a reference pulse 302 to control timing of its combination with a signal pulse 304 at the combiner 25 may be possible.

Actuators 104 may be of various types (e.g., mechanical motors, servos, etc.) and may be coupled to control position and orientation of the mirrors 110, 112 using various components (e.g., tracks, drive shafts, etc.). The actuators 104 may be configured to control position of the mirrors 110, 112 (e.g., vertical movement back and forth between positions A and B, and various intermediate positions, as desired), as well as orientation of the mirrors 110, 112 (e.g., attitude or angle of each mirror 110, 112, such as by rotation about a transverse or longitudinal axis or otherwise). Note that, although the embodiment of FIG. 5 depicts actuators 104 configured to control vertical movement of the mirrors 110, 112, in some embodiments, the mirrors can be controlled to move in essentially any desired direction, either in tandem or independently. Note also that, although a single item is shown for actuators 104, it will be understood that, in some embodiments, various numbers of actuators 104 may be used. The actuators 104 may further be configured to control the mirrors 110, 112 based on inputs from controller 30, as described further below, and may further be configured as desired to achieve the functionality described herein.

As noted above, in some embodiments, the system 5 may achieve the functionality of tunable delay line 24 using alternative configurations to the configuration of FIG. 5. For example, when the light source 10 comprises two or more pulse lasers, at least one of the pulse lasers (e.g., laser providing reference pulses) may have a slightly detuned repetition rate with respect to repetition rate of at least one of the other pulse lasers (e.g., laser providing signal pulses). In some embodiments, at least one pulse laser of the light source 10 may be configured to periodically modulate its pulse repetition rate, such as by increasing or decreasing pulse propagation frequency per unit time. The delay functionality achieved by adjustment of mirrors 110, 112 of tunable delay line 24 thus may be achieved by modulating propagation frequency of reference pulses (e.g., by a desired delay period) rather than by adjusting a length of the second path 16 (Reference Arm path above). In such embodiments, functionality of, the tunable delay line 24 may be replaced by the modulation of reference pulse repetition rates, which may generally allow the detector 26 to achieve faster scans than by use of a mechanical delay line. Other techniques for configuring system 5 to achieve the functionality ascribed to delay line 24 may be implemented in other embodiments, and in yet other embodiments, additional techniques may be apparent to one of ordinary skill in the art in light of this disclosure.

Figure 6:
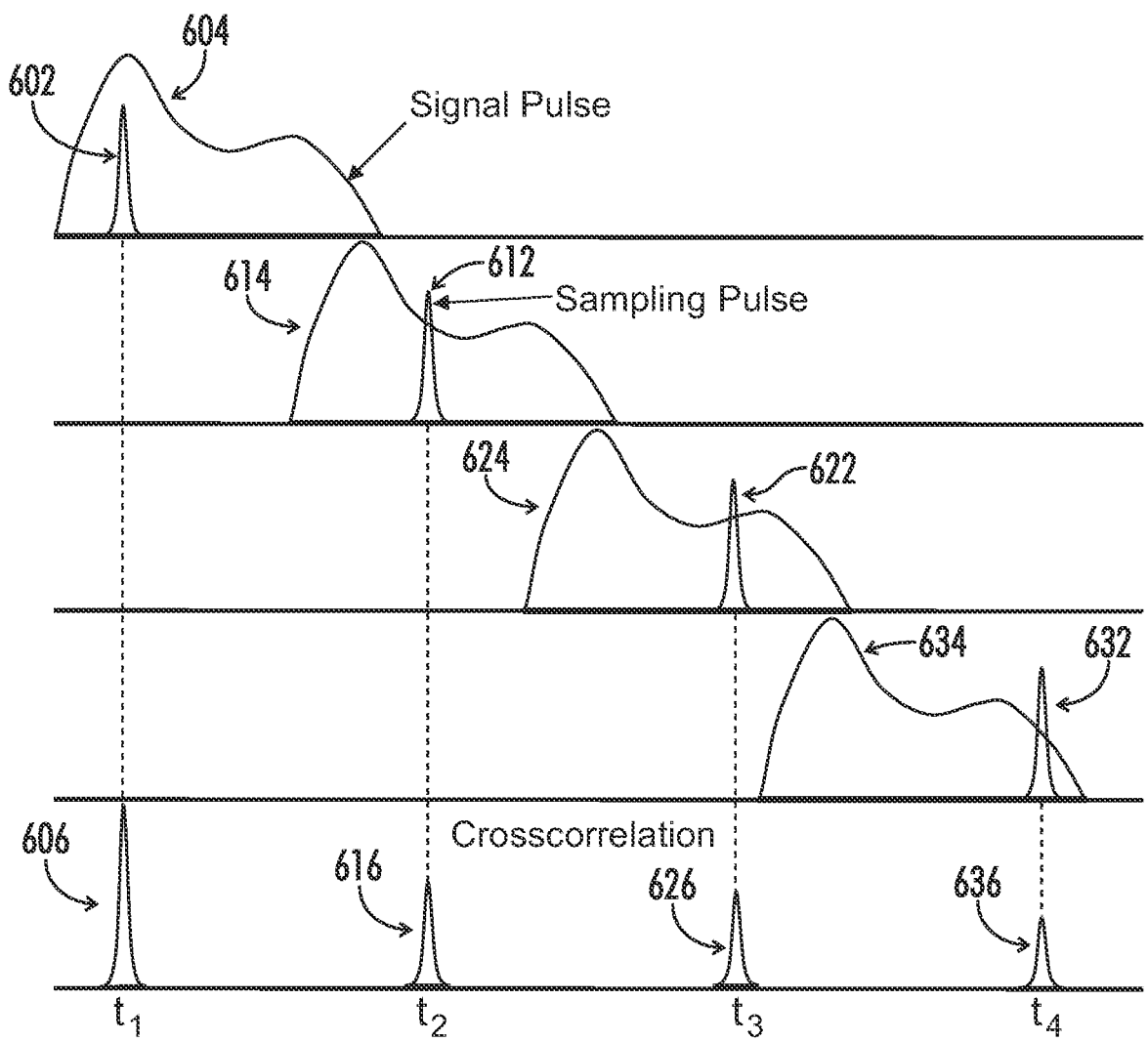
FIG. 6 depicts time-dependent graphs of pulse cross-correlation in a time-wavelength optical sampling system in accordance with some embodiments of the present disclosure.

Turning to FIG. 6, a signal pulse 604 from the first transmission path 14 and reference pulse 602 from the second transmission path 16 may be cross-correlated at the combiner 25 to generate a first cross-correlation signal 606. The combiner 25 may also receive a subsequent second signal pulse 614 and subsequent second reference pulse 612 delayed by a second delay of the tunable delay line 24, where the pulses may overlap to generate a second cross-correlation signal 616. Thereafter, a subsequent third signal pulse 624 and subsequent third reference pulse 622 delayed by a third delay of the tunable delay line 24, where the pulses may overlap to generate a third cross-correlation signal 626. A fourth cross-correlation signal 636 may be generated with a subsequent fourth reference pulse 632 and subsequent fourth signal pulse 634 overlap at combiner 25.

Detector 26 may be configured to detect the cross-correlation signals (e.g., signals 606, 616, 626, and 636) and generate an electronic signal indicative of the cross-correlation (interference) between reference pulses (e.g., pulses 602, 612, 622, and 632) and signal pulses (e.g., pulse 604, 614, 624, and 634) for provision to controller 30, where wavelength absorption indicated by the cross-correlation signals (e.g., cross-correlation signals 606, 616, 626 and 636) may be determined and substance composition may be identified. The detector 26 can be of various types configured for sensing optical signals. In some embodiments, the detector 26 comprises a photodetector, such as a photodiode. In some embodiments, the detector 26 can have various suitable components for detecting characteristics of optical signals, such as different types of diodes (e.g., silicon, gallium arsenide, etc.), various electrical components (e.g., resistors), voltage meters, or otherwise.

The cross-correlation signals of FIG. 6 indicate a portion of the respective signal pulses at which a reference pulse has overlapped. The portion indicated by the cross-correlation may correspond to a range of wavelengths of the signal pulse during the time interval of the overlap. The time intervals can be various durations in some embodiments (e.g., approximately less than 250 fs or other duration). The duration of the time intervals may be determined by duration of reference pulses, which may be controlled by light source 10, dispersion control of reference path 16, or otherwise. In addition, a delay period (e.g., a delay selected to achieve overlap of stretch and signal pulses at a desired time) may be controlled using tunable delay line 24 as described above.

For example, the first cross-correlation 606 may be indicative of wavelengths within a first portion of the first signal pulse 604 overlapped by the first reference pulse 602 delayed by a first delay so that it overlaps with the signal pulse 604 at a first time interval $t_1$. The system 5 (e.g., controller 30) may note the characteristics of the cross-correlation signal 606 (e.g., power values, duration, etc.) and adjust tunable delay line 24 to delay second reference pulse 612 by a second delay, such that it will overlap with a second portion of second signal pulse 614 corresponding to a second time interval $t_2$. The second portion may be different from the first portion. The system 5 (e.g., controller 30) may note the characteristics of the cross-correlation signal 616 (e.g., power values, duration, etc.) and repeat the process to determine subsequent delay values for subsequent reference pulses (e.g., pulses 622, 632) such that they will overlap with subsequent signal pulses (e.g., pulses 624, 634) at time intervals (e.g., $t_3$, $t_4$) corresponding to desired portions of respective signal pulses. The reference pulses 622, 632 may be delayed by third and fourth delay values using tunable delay line 24 as noted above. The system 5 (e.g., controller 30) may repeat these steps until sufficient or desired portions of a signal pulse have been sampled in order to identify power variations and thereby determine composition of the sample substance.

Figure 7:
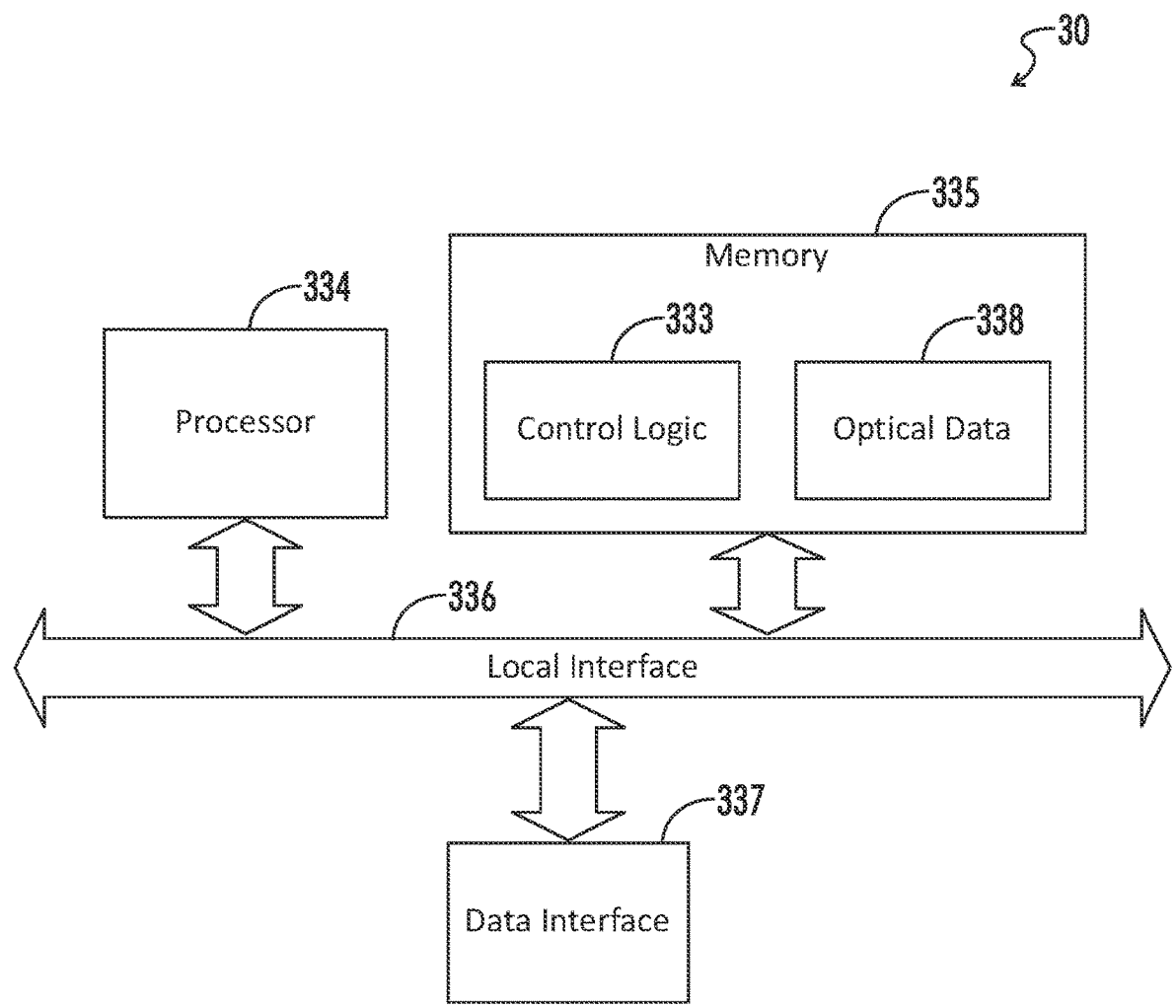
FIG. 7 depicts a block diagram of a controller of a time-wavelength optical sampling system in accordance with some embodiments of the present disclosure.

FIG. 7 depicts a block diagram of the controller 30. The controller 30 may include control logic 333 configured to control various operations of components of system 5 described herein. The control logic 333 can be implemented in software, hardware, firmware or any combination thereof. In the exemplary controller 30 illustrated by FIG. 7, the control logic 333 is implemented in software and stored in memory 335 of the controller 30. The controller 30 may be implemented as a combination of hardware and software, such as at least one microprocessor or other type of processor programmed with instructions for performing various functions. Other configurations of the controller 30 are possible in other embodiments. As an example, the controller 30 may be implemented as a field programmable gate array (FPGA) or other type hardware as may be desired.

The exemplary controller 30 depicted by FIG. 7 comprises at least one conventional processor 334, such as a digital signal processor (DSP) or a central processing unit (CPU), that communicates to and drives the other elements within the controller 30 via a local interface 336, which can include at least one bus. As an example, the processor 334 may execute instructions of the control logic 333 for performing functions of such control logic 333 when it is implemented in software. Optical data 338 may be stored in memory 335 and may include information used by the logic 333 to identify composition of a sample substance (trace gas) based on optical power variations detected in signal pulses (e.g., wavelengths absorbed by the trace gas), but may include other information in other embodiments. Furthermore, a data interface 337 permits the controller 330 to receive data from or communicate data to other components of the system 5 as may be desired.

The control logic 333 is configured to communicate with and control various resources of the system 5 (FIG. 1), such as light source 10, tunable delay line 24, detector 26, or otherwise. The control logic 333 may be configured to achieve various functions ascribed to components of the system 5 herein. As an example, the control logic 333 may communicate with light source 10 to control the optical signal, such as adjusting pulse frequency, toggling the optical signal, or otherwise. The control logic 333 may be configured to control operations of the tunable delay line 24 to achieve a desired delay of reference pulses, including positioning of mirrors 110, 112. Further, the control logic 333 may be configured to monitor portions of signal pulses sampled by reference pulses as detected by detector 26, determine a delay associated with a portion of a subsequent signal pulse for which sampling is desired, and control the tunable delay line 24 based on the determined delay. In other embodiments, other operations of system 5 may be controlled by control logic 333.

As an exemplary operation of the system 5 (e.g., controlled by controller 30), assume that a first reference pulse 602 is provided from the second path 16 to the tunable delay line 24 while mirrors 110, 112 are in a first position (e.g., position A or B, an intermediate position between points A and B, or otherwise). The first reference pulse 602 may be transmitted through the tunable delay line 24, interacting with mirrors 110, 112 and yielding a first delay period of the first reference pulse 602. The first reference pulse 602 may be delayed by the first delay period before continuing on to the combiner 25, where the first reference pulse 602 may be overlap with a first portion of a first signal pulse 604 to form a cross-correlation signal 606.

The first cross-correlation signal 606 may be detected by detector 26, which may provide information indicative of the first cross-correlation signal 606 to controller 30 (e.g., logic 333). The controller 30 may note information about the cross-correlation signal indicative of power variations corresponding to optical wavelength absorption and may store them in optical data 338.

The logic 333 may determine that sampling of a subsequent signal pulse 612 is desired, such as because insufficient variations caused by the trace gas have been sampled to enable the logic 333 to identify composition of the trace gas using the optical data 338. The logic 333 may note a first interval $t_1$ of the cross-correlation signal 606 and determine a second delay period corresponding to a desired second interval $t_2$ based on the first interval $t_1$. As an example, the second delay period may be selected such that adjacent wavelength ranges are overlapped by the pulse 612 relative to the pulse 602 and creating a corresponding cross-correlation signal 616 indicative of power variations of the signal pulse 614.

The logic 333 may determine a position of each of the mirrors 110, 112 that corresponds to the second delay period and may control the motorized translation stage 102 (e.g., actuators 104) to position of mirrors 110, 112 accordingly. Note that a position of the mirrors 110, 112 corresponding to the identified second delay period and second interval $t_2$ may be different from positions of the mirrors 110, 112 corresponding to the first delay period and first interval $t_1$. Accordingly, the tunable delay line 24 may delay the subsequent reference pulse 612 by the second delay period so that variations of pulse 614 are indicated by the cross-correlation signal 616 and detected by the detector 26.

The logic 333 may continue to use tunable delay line 24 to synchronize reference pulses (e.g., pulses 622, 632) with the signal pulses (e.g., pulses 624, 634) as desired, so that each time the optical gate is "open," a reference pulse overlaps with a different portion (i.e., wavelength range) of a signal pulse and a corresponding cross-correlation signal is generated. In this regard, the system 5 (e.g., logic 333) over a plurality of iterations may sample essentially the entire wavelength range of the signal pulses using optical gating.

Note that it is unnecessary for the reference pulse combined with signal pulses to be split from the same pulse. As an example, it is possible for the reference pulses combine with the signal pulses to be separately generated relative to the signal pulses.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. An optical sampling system, comprising:
   a light source configured to transmit an optical signal having a first pulse;
   a dispersion medium configured to receive and disperse the first pulse, thereby providing a dispersed first pulse;
   a sample chamber having a sample within an optical path of the dispersed first pulse;
   a combiner configured to receive the dispersed first pulse from the sample chamber and a second pulse, the combiner configured to combine the dispersed first pulse and the second pulse, thereby providing a first combined pulse, wherein a duration of the dispersed first pulse is greater than a duration of the second pulse at the combiner;
   an optical detector configured to detect the first combined pulse and to provide data indicative of the first combined pulse,
   wherein the system is configured to determine a composition of the sample based on the data.

2. The system of claim 1, further comprising a tunable delay line configured to delay the second pulse before the second pulse is received by the combiner.

3. The system of claim 2, further comprising a controller coupled to the tunable delay line and configured to control a delay of the second pulse by the tunable delay line.

4. The system of claim 3, further comprising a splitter optically coupled to the light source, the splitter configured to split the first pulse from the light source to provide the second pulse.

5. The system of claim 1, wherein:
   the optical signal has a third pulse;
   the dispersion medium is configured to receive and disperse the third pulse, thereby providing a dispersed third pulse;
   the sample is within an optical path of the dispersed third pulse;
   the combiner is configured to receive the dispersed third pulse from the sample chamber and a fourth pulse;
   the combiner is configured to combine the dispersed third pulse and the fourth pulse, thereby providing a second combined pulse;
   a duration of the dispersed third pulse is greater than a duration of the fourth pulse at the combiner; and
   the optical detector is configured to detect the second combined pulse and to provide data indicative of the second combined pulse,
   wherein the system is configured to determine the composition of the sample based on the data indicative of the second combined pulse.

6. The system of claim 5, further comprising a controller configured to control a timing of the second pulse relative to the dispersed first pulse such that the second pulse is cross-correlated by the combiner with the dispersed first pulse in a first wavelength range, the controller further configured to control a timing of the fourth pulse relative to the dispersed third pulse such that the fourth pulse is cross-correlated by the combiner with the dispersed third pulse in a second wavelength range different than the first wavelength range.

7. The system of claim 5, further comprising a tunable delay line configured to delay the second pulse before the second pulse is received by the combiner, wherein the tunable delay line is further configured to delay the fourth pulse before the fourth pulse is received by the combiner.

8. The system of claim 7, further comprising a controller configured to control a delay of the second pulse by the tunable delay line and a delay of the fourth pulse by the tunable delay line such that the delay of the second pulse is different than the delay of the fourth pulse.

9. The system of claim 7, further comprising a controller configured to control a delay of the second pulse by the tunable delay line and a delay of the fourth pulse by the tunable delay line such that (1) the second pulse is cross-correlated by the combiner with the dispersed first pulse in a first wavelength range and (2) the fourth pulse is cross-correlated by the combiner with the dispersed third pulse in a second wavelength range different than the first wavelength range.

10. An optical sampling system, comprising:
    a light source configured to transmit an optical signal having a plurality of first pulses;

a dispersion medium configured to receive and disperse the first pulses transmitted by the light source, thereby providing dispersed first pulses;

a sample chamber having a sample within an optical path of the dispersed first pulses;

a combiner configured to receive the dispersed first pulses from the sample chamber and a plurality of second pulses, the combiner configured to combine the dispersed first pulses and the second pulses, thereby cross-correlating each of the dispersed first pulses with a respective one of the second pulses in different wavelength ranges; and an optical detector configured to detect the cross-correlated pulses and to provide data indicative of the cross-correlated pulses, wherein the system is configured to determine a composition of the sample based on the data.

11. The system of claim 10, further comprising a splitter optically coupled to the light source, the splitter configured to split the first pulses to provide the second pulses.

12. The system of claim 10, further comprising a tunable delay line configured to delay the second pulses.

13. The system of claim 12, further comprising a controller configured to control delays of the second pulses by the tunable delay line.

14. An optical sampling method, comprising:
transmitting an optical signal from a light source, the optical signal having a first pulse;
dispersing the first pulse with a dispersion medium, thereby providing a dispersed first pulse;
receiving at a combiner the dispersed first pulse from a sample;
receiving a second pulse at the combiner;
combining the dispersed first pulse and the second pulse with the combiner, thereby providing a first combined pulse, wherein a duration of the dispersed first pulse is greater than a duration of the second pulse at the combiner;
detecting the first combined pulse with an optical detector; and
determining a composition of the sample based on the detecting.

15. The method of claim 14, further comprising delaying, with a tunable delay line, the second pulse before the combining.

16. The method of claim 14, further comprising splitting the first pulse with a splitter to provide the second pulse.

17. The method of claim 14, wherein the optical signal has a third pulse, and wherein the method further comprises:
dispersing the third pulse with the dispersion medium, thereby providing a dispersed third pulse;
receiving at the combiner the dispersed third pulse from the sample;
receiving a fourth pulse at the combiner;
combining the dispersed third pulse and the fourth pulse with the combiner, thereby providing a second combined pulse, wherein a duration of the dispersed third pulse is greater than a duration of the fourth pulse at the combiner; and
detecting the second combined pulse with the optical detector,
wherein the determining is based on the detecting the second combined pulse.

18. The method of claim 17, further comprising:
controlling a timing of the second pulse relative to the dispersed first pulse such that the second pulse is cross-correlated by the combiner with the dispersed first pulse in a first wavelength range; and
controlling a timing of the fourth pulse relative to the dispersed third pulse such that the fourth pulse is cross-correlated by the combiner with the dispersed third pulse in a second wavelength range different than the first wavelength range.

19. The method of claim 17, further comprising:
delaying, with a tunable delay line, the second pulse before the combining the dispersed first pulse and the second pulse; and
delaying, with the tunable delay line, the fourth pulse before the combining the dispersed third pulse and the fourth pulse.

20. The method of claim 19, further comprising controlling the tunable delay line such that a delay of the second pulse by the tunable delay line is different than a delay of the fourth pulse by the tunable delay line.

21. The method of claim 19, further comprising controlling a delay of the second pulse by the tunable delay line and a delay of the fourth pulse by the tunable delay line such that (1) the second pulse is cross-correlated by the combiner with the first dispersed pulse in a first wavelength range and (2) the fourth pulse is cross-correlated by the combiner with the dispersed third pulse in a second wavelength range different than the first wavelength range.

22. An optical sampling method, comprising:
transmitting an optical signal from a light source, the optical signal having a plurality of first pulses;
dispersing the first pulses with a dispersion medium, thereby providing dispersed first pulses;
receiving at a combiner the dispersed first pulses from a sample;
receiving a plurality of second pulses at the combiner;
combining the dispersed first pulses and the second pulses with the combiner, thereby cross-correlating each of the dispersed first pulses with a respective one of the second pulses in different wavelength ranges;
detecting the cross-correlated pulses with an optical detector; and
determining a composition of the sample based on the detecting.

23. The method of claim 22, further comprising splitting the first pulses with a splitter to provide the second pulses.

24. The method of claim 22, further comprising delaying each of the second pulses with a tunable delay line before the respective second pulse is received by the combiner.

* * * * *